March 3, 1931. C. C. WORTHINGTON 1,794,880
MOTOR GANG LAWN MOWER
Original Filed Dec. 30, 1924  2 Sheets-Sheet 1
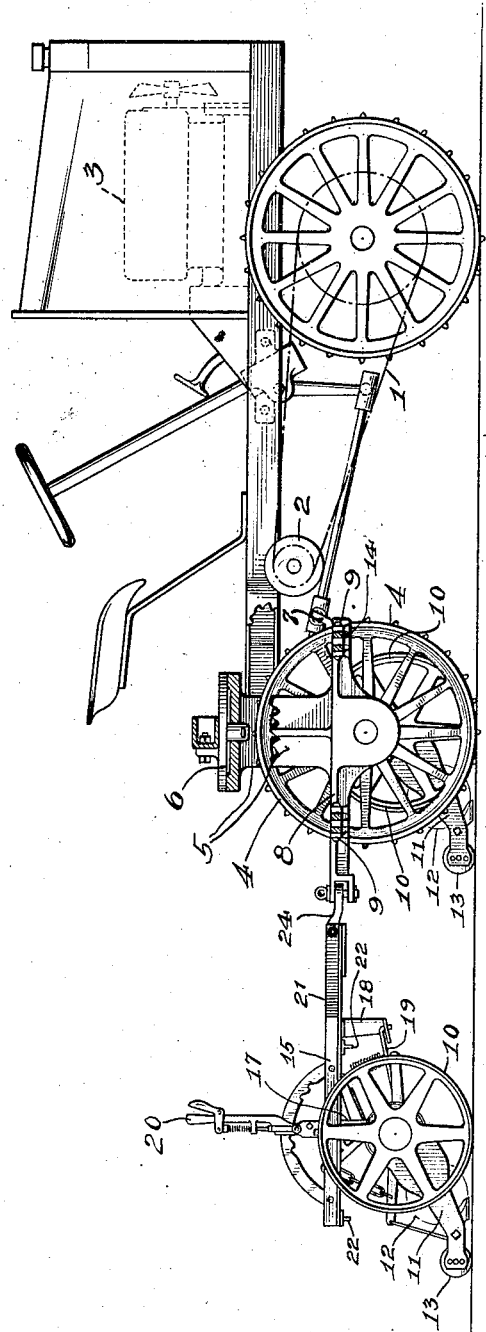

March 3, 1931.  C. C. WORTHINGTON  1,794,880
MOTOR GANG LAWN MOWER
Original Filed Dec. 30, 1924  2 Sheets-Sheet 2
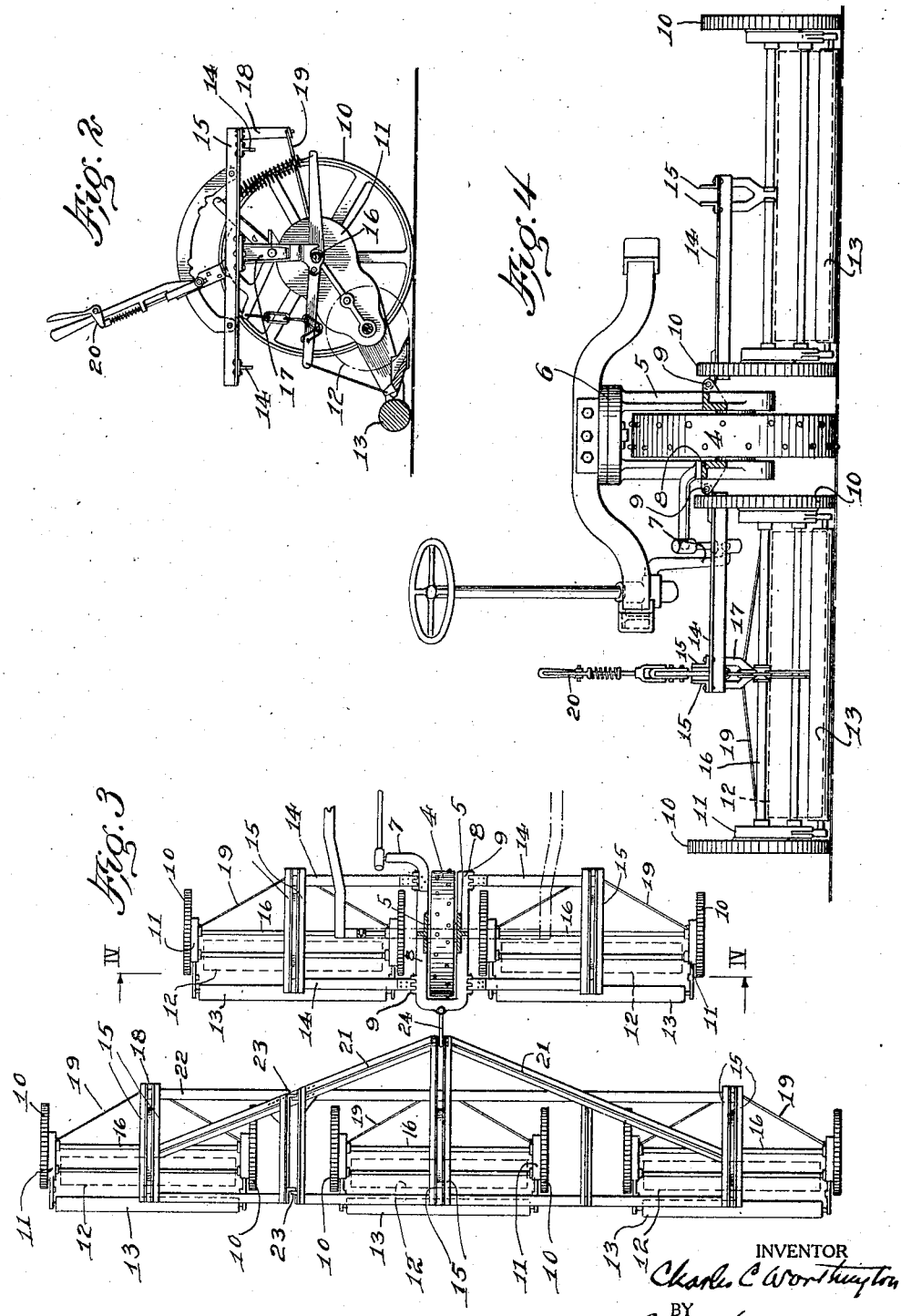

Patented Mar. 3, 1931

1,794,880

UNITED STATES PATENT OFFICE

CHARLES C. WORTHINGTON, OF DUNFIELD, NEW JERSEY

MOTOR GANG LAWN MOWER

Application filed December 30, 1924, Serial No. 758,803. Renewed November 1, 1929.

The object of this invention is a compact lawn mowing equipment in which the operator or driver can be stationed sufficiently forward of the gang of rotary cutters to escape the shower of dust and grass thrown up by them and, at the same time, have an adequate view of the swath being cut, and in which the total longitudinal dimension is reduced so that it can be readily guided into and out of restricted areas and can be stored in ordinary garages spaces. The principle of the invention, whereby these and other objects are attained, involves the location of the unit or units constituting the front row of the gang alongside of the rear wheel or wheels of the vehicle part of the apparatus, which wheels are, or can be, the steering wheels, being pivoted to the frame of the vehicle by a fifth wheel joint for this purpose, and substantially under the operator's station.

In the accompanying drawing Figure 1 is a side elevation of the form of motor gang lawn mower at present preferred, according to this invention, parts being in section.

Fig. 2 is a vertical central section of one of the front units.

Fig. 3 is a smaller scale plan of the gang of units and the rear of the vehicle, parts being broken away and in section; and Fig. 4 is a rear elevation of the front row of units, parts being in section, taken on the line IV—IV of Fig. 3.

The front wheels of the self-propelled vehicle, as herein shown, are the drive wheels, driven by a sprocket chain 1 from a lay shaft 2 which latter is driven by the engine 3 by any appropriate means not indicated in the drawing, but understood to include the usual change-speed mechanism and other facilities for controlling the drive, as customary in automobiles or tractors.

The steering of the vehicle is done by the rear wheel or wheels, represented in the present case by a single wheel 4 having a wide tread, and journalled in a yoke-form bolster 5 which supports the rear end of the vehicle frame through the intervention of a fifth wheel joint 6, of usual or any suitable design. The construction of the bolster may be as a single casting, as shown, or a suitable assemblage of parts as will be understood. Steering is effected by the crank arm 7 and suitable linkage to the steering column, which is placed directly in front of the operator's seat and the latter is situated above the rear end of the vehicle frame and the fifth wheel.

On its opposite sides, the bolster is provided with two horizontal rails 8, each of which is formed or provided with front and rear hinge ears 9, and a lawn mower unit is placed on each side of the bolster and connected to these ears by suitable holding means, so that they keep in transverse alignment with each other and together constitute the front row of the gang of units and turn with the steering wheel about the vertical axis of the fifth wheel joint.

The lawn mower units may be of any suitable type and are shown of conventional form, having ground wheels 10 journalled in the unit frames 11 and driving the rotary cutter reels 12 indicated in dotted lines. The front ends of the unit frames are supported by their ground wheels and their rear ends are normally supported by their wiper rollers 13.

The two front units are connected to the bolster by draft frames or frame-sections 14, which are directly hinged or pinned to the ears 9 so that they may swing up and down but are horizontally rigid with the bolster. These frames 14 rest on the units at their outer ends and are connected with them so as to hold them at all times parallel with the axis of the steering wheel 4, or square to the direction of travel, but so as to permit each to operate on ground of different elevation and different slope from that of the steering wheel, or the other unit; that is to say, each unit can tilt independently in the vertical plane of the axis of its ground wheels and can also independently rise and fall in accommodation to undulations of the ground being mowed. Each frame section 14 includes two angle bars 15 which are centrally supported on the cross rod 16 of the unit frame by means of a divided post structure 17 and carry a depending draft post 18 which latter is connected by draft links 19 to the opposite sides of the unit frame. This method of connection permits the unit movements above referred to while keeping the unit rigidly in substantial alignment with or parallel to the axis of the steering wheel 4. The space between the angle bars 15 and the divided parts of the post structure 17 accommodates the usual control handle 20 by means of which the rear end of the frame and the rotary cutter may be lifted more or less from the ground to make a high cut of the grass. This handle also serves as usual to control the spring pressure by which the cutters are pressed toward the ground. The design of this control mechanism forms no part of the present invention and being well known to the art needs no description.

The units constituting the rear row of the gang are organized in a framework which keeps them also parallel with each other and each in overlapping relation to the units of the front row, while also permitting their independent accommodation to the undulations and different elevations of the ground, the same as with the front units. This framework may be variously designed for this purpose and as herein shown comprises a main frame section 21 superposed upon or over two of the rear units, and an end section 22 superposed upon or over the remaining unit and connected to the section 21 by means of a hinge 23, the axis of which is parallel to the direction of travel, so that the end section may swing vertically with reference to the main section but is horizontally rigid with it. The main section 21 is in the present case, supported directly on its two units, but it might have wheels of its own, if preferred. Its connection to the units in the present case is by means of bearing posts 17, one engaging the cross-rod 16 of each unit and by means of draft or stay links 19 connecting the sides of the units to the draft posts 18 exactly the same as already described in connection with the front units.

The end section 22 is similarly connected to its unit by a bearing post, draft post 18 and draft links so that this unit also has the same freedom of motion with reference to its frame section as the others, being held nevertheless at all times in alignment with or parallel to the other units of its row.

The framework of the rear row is connected to the front row and the vehicle by means of a clevis 24 or other form of connection which is mounted on the forward end of the main section 21 and attached by a removable pin to the rear end or cross-bar of the bolster 5, so as to allow the rear framework ample freedom to move in vertical and horizontal angles with respect to the vehicle and the front row of units. The rear row of units thus occupies a position close in rear of the self-propelled vehicle being in fact in the same position which is occupied by the front row of units in other types of lawn mowing apparatus and is thus sufficiently forward to enable the operator to observe the work without special effort, while making the equipment, as a whole, much shorter than in the common tractor-mower combination. It will be apparent that these advantages obtain irrespective of the number of lawn mower units constituting the rows and accordingly that this number may be varied to suit the tractive power available and also that the specific detail of the frame section and their manner of construction and assemblage and particularly the style of hinge-joints of the frame sections, may likewise be varied from that shown in the drawings without departing from the principle of the invention which has now been disclosed.

I claim:

1. The combination of a self-propelled vehicle having a rear wheel arranged for angular movement on a vertical axis for steering, a lawn mower unit having ground wheels located at the side of said rear steering wheel and a rigid framework pivotally connected to the latter and to the lawn mower unit.

2. The combination of a self-propelled vehicle having a single rear wheel arranged for angular movement on a vertical axis for steering, and two lawn mower units having ground wheels connected to the vehicle on opposite sides of said steering wheel, connecting means for each unit having a pivotal connection therewith and with the steering wheel mounting and a rear unit connected to follow said first units in overlapping relation thereto.

3. The combination of a self-propelled vehicle having a rear steering wheel and bolster supporting the vehicle frame by a fifth wheel joint, a lawn mower unit located at the side of said rear steering wheel and hinged to said bolster and a rear lawn mower unit connected to follow said first unit in overlapping relation thereto.

4. The combination of a self-propelled vehicle having a rear steering wheel and bolster supporting the vehicle frame by a fifth wheel joint, a rigid frame hinged to said bolster and a lawn mower unit connected with said frame in fixed radial relationship therewith.

5. The combination of a self-propelled vehicle having a rear steering wheel and bolster supporting the vehicle frame by a fifth wheel joint, a rigid frame hinged to said bolster and a lawn mower unit connected with said frame for pivotal movement in a vertical plane with respect thereto.

6. The combination of a self-propelled vehicle having a rear steering wheel and bolster and two lawn mower units having holding frame sections hinged respectively to opposite sides of said bolster so as to partake of the steering movement thereof and to permit independent accommodation of said units to ground undulations and a rear unit connected to said bolster in overlapping relation to the front units.

7. The combination with a self-propelled vehicle, of two front lawn mower units, frame sections hinged to the vehicle for vertical movement with respect thereto and connecting the units to the vehicle on opposite sides of a rear wheel thereof and in substantial alignment with said wheel's axis, and a rear row of lawn mower units having a framework connected to the vehicle independently of said frame sections.

8. The combination in a self-propelled vehicle, of a rear wheel therefor, a rear lawn mower unit connected to the vehicle and forwardly drawn thereby, a front lawn mower unit located at the side of said wheel and in overlapping relation to said rear unit, a member connected to the vehicle adjacent the wheel for vertical movement relatively thereto, and connections between said member and said front unit, holding the latter square to the direction of travel while permitting it to rock in a vertical plane transversely of the line of travel.

9. A power gang lawn mower comprising the combination with a vehicle having front and rear wheels, steering mechanism and a propelling motor, of a plurality of rows of lawn mower units connected to the vehicle, the front row being substantially in the transverse line of the rear wheel or wheels of the vehicle and another row in rear of the vehicle in overlapping relation to the front row.

10. A power gang lawn mower comprising a self-propelled vehicle having a row of lawn mower units connected thereto in overlapping relation to the rear end of the vehicle and in substantial alignment with the rear axle, a second row in rear thereof and an operator's station on the vehicle arranged substantially over said first mentioned row of units.

11. A power gang lawn mower comprising the combination with a vehicle having front and rear wheels, steering mechanism and a propelling motor, of a plurality of rows of lawn mower units connected to the vehicle, the front row being substantially in the transverse line of the rear wheel or wheels of the vehicle and another row in rear of the vehicle in overlapping relation to the front row, said units each having cutter driving ground wheels for individually operating the same.

12. A power gang lawn mower comprising the combination with a vehicle having front and rear wheels, steering mechanism and a propelling motor, of a plurality of rows of lawn mower units connected to the vehicle, the front row being substantially in the transverse line of the rear wheel or wheels of the vehicle and another row in rear of the vehicle in overlapping relation to the front row, the units of said last mentioned row connected to the vehicle for horizontal angular movement relatively thereto.

In testimony whereof, I have signed this specification.

CHARLES C. WORTHINGTON.